United States Patent [19]

Light, Sr. et al.

[11] Patent Number: 5,271,767

[45] Date of Patent: * Dec. 21, 1993

[54] ODOR-FREE HOT-MIX ASPHALT COMPOSITION

[75] Inventors: Terry J. Light, Sr., Livingston; William T. Ballenger, Jr., San Benito, both of Tex.

[73] Assignee: Asphalt Control Systems Inc., Livingston, Tex.

[*] Notice: The portion of the term of this patent subsequent to Nov. 17, 2009 has been disclaimed.

[21] Appl. No.: 961,495

[22] Filed: Oct. 16, 1992

Related U.S. Application Data

[63] Continuation-in-part of Ser. No. 771,566, Oct. 7, 1991, Pat. No. 5,164,002.

[51] Int. Cl.$^5$ ............................................. C09D 195/00
[52] U.S. Cl. ................................. 106/246; 106/248; 106/273.1
[58] Field of Search ............... 106/244, 248, 252, 246, 106/267, 273.1

[56] References Cited

U.S. PATENT DOCUMENTS 5,053,118  10/1991  Houser ............................... 208/45
5,164,002  11/1992  Ballenger, Jr. et al. ............. 106/267

Primary Examiner—David Brunsman
Attorney, Agent, or Firm—Neal J. Mosely

[57] ABSTRACT

An odor-free hot-mix asphalt composition consists essentially of liquid asphalt, or a hot-mix asphalt or a hot mix, cold lay asphalt, or a rubberized hot mix asphalt or a hot mix asphalt with added latex, containing an effective amount of an additive comprising a citrus terpene (4-isopropyl 1-methylcyclohexene) D-limonene mixed with a vegetable oil such as cottonseed oil, soya oil, rapeseed (canola) oil, peanut oil, corn oil, sunflower oil, palm oil, coconut oil, and palm kernel oil. etc. and an effective amount of a silicone oil dispersant. A preferred additive composition consists essentially of 10–15 parts citrus terpene (D-limonene) and 85–90 parts vegetable oil, and an effective amount up to about 2 parts silicone oil, the parts in the composition totaling 100. When 0.5–1.0 parts of this composition are mixed with 99.0–99.5 parts liquid asphalt the resulting liquid asphalt composition is substantially free of characteristic asphalt odors, and other objectionable odors. When 4–8 parts of the mixture are mixed with 99–96 parts of aggregate, the resulting hot-mix asphalt composition is substantially free of characteristic asphalt odor, and other objectionable odors. The exhaust fumes from a hot-mix asphalt plant are also free of characteristic asphalt odor, and other objectionable odors.

13 Claims, No Drawings

ODOR-FREE HOT-MIX ASPHALT COMPOSITION

CROSS REFERENCE TO RELATED APPLICATION

This application is a continuation-in-part of the copending application W. T. Ballenger, Jr. and T. J. Light, Sr., Ser. No. 07/771,566, filed Oct. 7, 1991, now U.S. Pat. No. 5,164,002, entitled ANTISTRIPPING ASPHALT COMPOSITIONS.

BACKGROUND OF THE INVENTION

1. Field of the Invention

This invention relates generally to hot-mix asphalt compositions and more particularly to hot-mix asphalt, hot-mix, cold-lay asphalt, rubberized hot mix asphalt or hot mix asphalt containing added latex, containing additive compositions which substantially eliminate odor.

2. Brief Description of the Prior Art

The need for odor reduction in hot-mix asphalt compositions is well known but no general solution to the problem is commercially available.

Our copending patent application Ser. No. 07/771,566, filed Oct. 7, 1991, now U.S. Pat. No. 5,164,002, discloses the use of compositions described herein as antistripping compositions and mentions reduction of odor.

The present invention is distinguished over the prior art in general, by providing an improved liquid asphalt composition containing an additive which consists essentially of a citrus terpene (4-isopropyl 1-methylcyclohexene) D-limonene mixed with a vegetable oil such as cottonseed oil, soya oil, rapeseed (canola) oil, peanut oil, corn oil, sunflower oil, palm oil, coconut oil, and palm kernel oil. etc. and a silicone oil dispersant and hot-mix asphalt, hot-mix, cold-lay asphalt, rubberized hot mix asphalt or hot mix asphalt containing added latex produces from the liquid asphalt containing the additive. The composition is substantially free of asphalt odors as determined by smell and as confirmed by chromatographic studies.

SUMMARY OF THE INVENTION

It is therefore an object of the present invention to provide a new and improved hot-mix asphalt, hot-mix, cold-lay asphalt, rubberized hot mix asphalt or hot mix asphalt containing added latex, composition which is substantially free of asphalt odors and other objectionable odors.

It is another object of this invention to provide a new and improved hot-mix asphalt, hot-mix, cold-lay asphalt, rubberized hot mix asphalt or hot mix asphalt containing added latex, composition which is substantially free of asphalt odors, and other objectionable odors, containing an odor eliminating additive.

Another object of this invention is to provide a new and improved hot-mix asphalt, hot-mix, cold-lay asphalt, rubberized hot mix asphalt or hot mix asphalt containing added latex, composition which is substantially free of asphalt odors, and other objectionable odors, containing an odor eliminating additive which is biodegradable and ecologically acceptable.

Another object of this invention is to provide a new and improved hot-mix asphalt, hot-mix, cold-lay asphalt, rubberized hot mix asphalt or hot mix asphalt containing added latex, composition which is substantially free of asphalt odors, and other objectionable odors, containing an odor eliminating additive which is biodegradable and ecologically acceptable and substantially eliminates odor of asphalt compositions, and other objectionable odors, which consists essentially of a vegetable oil, D-limonene, and a silicone oil.

A further object of this invention is to provide a new and improved liquid asphalt composition which is substantially free of asphalt odors, and other objectionable odors, containing an odor eliminating additive formulated into an asphalt/aggregate hot-mix asphalt composition comprising 4-8 parts of the liquid-asphalt/additive composition containing 0.5-1.0 parts of an odor eliminating additive which is biodegradable and ecologically acceptable, and 92-96 parts aggregate.

A further object of this invention is to provide a new and improved liquid asphalt composition which is substantially free of asphalt odors, and other objectionable odors, containing an odor eliminating additive, formulated into a hot-mix asphalt/aggregate paving composition comprising 4-8 parts of the liquid asphalt/additive composition containing 0.5-1.0 parts of an odor eliminating additive which consists essentially of a vegetable oil, D-limonene, and a silicone oil.

A further object of this invention is to provide a new and improved liquid asphalt composition which is substantially free of asphalt odors, and other objectionable odors, containing an odor eliminating additive, formulated into a hotmix asphalt/aggregate paving composition comprising 4-8 parts of the liquid asphalt/additive composition containing 0.5-1.0 parts of an odor eliminating additive which consists essentially of a vegetable oil 85-90 parts, D-limonene 10-15 parts, and a silicone oil up to 2 parts.

Other objects of the invention will become apparent from time to time throughout the specification and claims as hereinafter related.

DESCRIPTION OF THE PREFERRED EMBODIMENTS

The present invention is directed to novel liquid asphalt, hot-mix asphalt, hot-mix, cold-lay asphalt, rubberized hot mix asphalt or hot mix asphalt containing added latex, compositions containing additives which substantially eliminate the characteristic odor of hot-mix asphalt, and other objectionable odors.

The odor eliminating additives consist essentially of a citrus terpene (4-isopropyl 1-methylcyclohexene) D-limonene, derived from citrus oils, mixed with a vegetable oil such as cottonseed oil, soya oil, rapeseed (canola) oil, peanut oil, corn oil, sunflower oil, palm oil, coconut oil, and palm kernel oil. etc. and a silicone oil dispersant. The citrus terpene D-limonene described in the Concise Chemical Dictionary as an optically active terpene closely related to isoprene (with physical and chemical properties given) and is derived from lemons, oranges, etc. This additive has been determined to be biodegradable and ecologically acceptable.

A preferred additive composition consists essentially of 10-15 parts citrus terpene (D-limonene) and 85-90 parts vegetable oil, and an effective amount up to about 2 parts silicone oil (dispersing agent), the parts in the composition totaling 100. In formulating the composition, the silicone oil is first mixed with the D-limonene (because it is more soluble in this component) and the vegetable oil mixed in to produce the desired composition. This additive composition must be kept at temperatures above 65° F. (but not substantially exceeding usual hot melt temperatures for hot-mix asphalt) to maintain fluidity. It is preferred to use a heated storage tank for this additive.

Next, 0.5–1.0 parts of this composition were thoroughly mixed with 99.0–99.5 parts asphalt to produce a liquid asphalt composition. Then 4–8 parts of the liquid asphalt/additive mixture were added to 92–96 parts of aggregate to produce a hot-mix asphalt. The compositions can also be made up as hot-mix asphalt, hot-mix, cold-lay asphalt, rubberized hot mix asphalt or hot mix asphalt containing added latex. The resulting asphalt/aggregate composition has been found useful as a hot-mix asphalt for paving. The additive is biodegradable and ecologically acceptable and substantially eliminates asphalt odors, and other objectionable odors, from the liquid asphalt and from hot-mix asphalt, hot-mix, cold-lay asphalt, rubberized hot mix asphalt or hot mix asphalt containing added latex.

The following Examples are representative of the embodiments of this invention and indicate their acceptability.

EXAMPLE 1

An odor-eliminating additive composition was prepared by thoroughly mixing silicone oil into D-limonene at room temperature and cottonseed oil mixed in. In formulating the composition, the silicone oil is first mixed with the D-limonene (because it is more soluble in this component) and the vegetable oil mixed in to produce the desired composition. The final proportions were 0.5 parts silicone oil; 90 parts cottonseed oil and 10 parts D-limonene.

This odor-eliminating additive composition was maintained at a temperature above 65° F. to produce a fluidity satisfactory for further processing. A mixture was prepared of 1.0 part of the odor-eliminating additive composition with 99.0 parts of liquid asphalt. The mixture was substantially free from characteristic asphalt odors, and other objectionable odors, as observed by smell and by chromatographic tests.

The liquid asphalt alone and with 1% of the odor eliminating additive were separately tested by gas chromatography for volatiles which contribute to the objectionable odors associated with hot-mix asphalt. In each case, the composition was heated to 300° F. in a closed vessel and air samples taken from the overhead space. The air samples were evaluated by gas chromatography for odor-promoting volatiles. The liquid asphalt, with no additive present, contained the following amounts of volatiles: methane 12.8 ppm; ethane 12.3 ppm; propane 17.0 ppm; isobutane 1.9 ppm; n-butane 8.9 ppm; isopentane 2.5 ppm; n-pentane 5.9 ppm; pentenes 3.5 ppm; hexanes 21.3 ppm; and total aromatics 1.4 ppm. The liquid asphalt, with 1.0% of the odor eliminating additive present, contained the following amounts of volatiles: methane 6.1 ppm; ethane 4.8 ppm; propane 7.1 ppm; isobutane 1.3 ppm; n-butane 4.0 ppm; isopentane 1.3 ppm; n-pentane 3.1 ppm; pentenes 2.5 ppm; hexanes 16.1 ppm; and total aromatics 0.8 ppm. In every category, there was a substantial reduction in hydrocarbon volatiles. This, together with the elimination of odor as evidenced by smell, is convincing evidence of the elimination of odor from liquid asphalt by use of the additive described above.

Then 4.2 parts hot-mix asphalt/odor-eliminating additive agent composition was mixed with 95.8 parts aggregate and tested and found satisfactory as an odorless hot-mix asphalt for highway paving use or for patching. The odor-eliminating additive agent is biodegradable and meets environmental standards. The reduction in odor is sufficient to avoid the usual objections to the use of hot-mix asphalt and associated health hazards. The additive agent is also effective in eliminating asphalt odors, and other objectionable odors, from the exhaust gases from the plant in which the hot-mix asphalt is formulated or produced. The additive is not only effective with liquid asphalt and hot-mix asphalt, but also with hot-mix, cold-lay asphalt, rubberized hot mix asphalt or hot mix asphalt containing added latex.

EXAMPLE 2

An odor-eliminating additive composition is prepared by thoroughly mixing silicone oil into D-limonene at room temperature and soya oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts soya oil and 9.5 parts D-limonene.

This odor-eliminating additive composition is maintained at a temperature above 65° F. to produce a fluidity satisfactory for further processing. A mixture is prepared of 1.0 part of the odor-eliminating additive composition with 99.0 parts of hot-mix asphalt. The mixture is substantially free from characteristic asphalt odors, and other objectionable odors, as observed by smell and by chromatographic tests.

The liquid asphalt alone and with 1% of the odor eliminating additive were separately tested by gas chromatography for volatiles which contribute to the objectionable odors associated with hot-mix asphalt. In each case, the composition was heated to 300° F. in a closed vessel and air samples taken from the overhead space. The air samples were evaluated by gas chromatography for odor-promoting volatiles. The liquid asphalt, with no additive present, contained the following amounts of volatiles: methane 12.8 ppm; ethane 12.3 ppm; propane 17.0 ppm; isobutane 1.9 ppm; n-butane 8.9 ppm; isopentane 2.5 ppm; n-pentane 5.9 ppm; pentenes 3.5 ppm; hexanes 21.3 ppm; and total aromatics 1.4 ppm. The liquid asphalt, with 1.0% of the odor eliminating additive present, contained the following amounts of volatiles: methane 6.1 ppm; ethane 4.8 ppm; propane 7.1 ppm; isobutane 1.3 ppm; n-butane 4.0 ppm; isopentane 1.3 ppm; n-pentane 3.1 ppm; pentenes 2.5 ppm; hexanes 16.1 ppm; and total aromatics 0.8 ppm. In every category, there was a substantial reduction in hydrocarbon volatiles. This, together with the elimination of odor as evidenced by smell, is convincing evidence of the elimination of odor by use of the additive described above.

Then 4.2 parts hot-mix asphalt/odor-eliminating additive agent composition was mixed with 95.8 parts aggregate and tested and found satisfactory as an odorless hot-mix asphalt for highway paving use or for patching. The odor-eliminating additive agent is biodegradable and meets environmental standards. The reduction in odor is sufficient to avoid the usual objections to the use of hot-mix asphalt and associated health hazards. The additive agent is also effective in eliminating asphalt odors, and other objectionable odors, from the exhaust gases for the plant in which the hot-mix asphalt is formulated or produced. The additive is not only effective with liquid asphalt and hot-mix asphalt, but also with hot-mix, cold-lay asphalt, rubberized hot mix asphalt or hot mix asphalt containing added latex.

EXAMPLE 3

An odor-eliminating additive composition is prepared by thoroughly mixing silicone oil into D-limonene at room temperature and canola oil mixed in. In formulating the composition, the silicone oil is first mixed with the D-limonene (because it is more soluble in this component) and the canola oil mixed in to produce the desired composition. The final proportions are 0.80 parts silicone oil; 89.6 parts canola oil and 9.6 parts D-limonene.

This odor-eliminating additive composition was maintained at a temperature above 65° F. to produce a fluidity satisfactory for further processing. A mixture was prepared of 1.0 part of the odor-eliminating additive composition with 99.0 parts of liquid asphalt. The mixture was substantially free from characteristic asphalt odors, and other objectionable odors, as observed by smell and by chromatographic tests.

The liquid asphalt alone and with 1% of the odor eliminating additive were separately tested by gas chromatography for volatiles which contribute to the objectionable odors associated with hot-mix asphalt. In each case, the composition was heated to 300° F. in a closed vessel and air samples taken from the overhead space. The air samples were evaluated by gas chromatography for odor-promoting volatiles. The liquid asphalt, with no additive present, contained the following amounts of volatiles: methane 12.8 ppm; ethane 12.3 ppm; propane 17.0 ppm; isobutane 1.9 ppm; n-butane 8.9 ppm; isopentane 2.5 ppm; n-pentane 5.9 ppm; pentenes 3.5 ppm; hexanes 21.3 ppm; and total aromatics 1.4 ppm. The liquid asphalt, with 1.0% of the odor eliminating additive present, contained the following amounts of volatiles: methane 6.1 ppm; ethane 4.8 ppm; propane 7.1 ppm; isobutane 1.3 ppm; n-butane 4.0 ppm; isopentane 1.3 ppm; n-pentane 3.1 ppm; pentenes 2.5 ppm; hexanes 16.1 ppm; and total aromatics 0.8 ppm. In every category, there was a substantial reduction in hydrocarbon volatiles. This, together with the elimination of odor as evidenced by smell, is convincing evidence of the elimination of odor from liquid asphalt by use of the additive described above.

Then 4.2 parts hot-mix asphalt/odor-eliminating additive agent composition was mixed with 95.8 parts aggregate and tested and found satisfactory as an odorless hot-mix asphalt for highway paving use or for patching. The odor-eliminating additive agent is biodegradable and meets environmental standards. The reduction in odor is sufficient to avoid the usual objections to the use of hot-mix asphalt and associated health hazards. The additive agent is also effective in eliminating asphalt odors, and other objectionable odors, from the exhaust gases for the plant in which the hot-mix asphalt is formulated or produced. The additive is not only effective with liquid asphalt and hot-mix asphalt, but also with hot-mix, cold-lay asphalt, rubberized hot mix asphalt or hot mix asphalt containing added latex.

EXAMPLE 4

An odor-eliminating additive composition is prepared by thoroughly mixing silicone oil into D-limonene at room temperature and peanut oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts peanut oil and 9.5 parts D-limonene.

This odor-eliminating additive composition is maintained at a temperature above 65° F. to produce a fluidity satisfactory for further processing. A mixture is prepared of 1.0 part of the odor-eliminating additive composition with 99.0 parts of liquid asphalt. The liquid asphalt/odor-eliminating additive agent composition (6 parts) is then mixed with aggregate (94 parts) and forms an odorless hot-mix asphalt satisfactory for highway paving use or for patching.

The odor-eliminating additive agent is biodegradable and meets environmental standards. The reduction in odor is sufficient to avoid the usual objections to the use of hot-mix asphalt and associated health hazards. The liquid asphalt alone and with 1% of the odor eliminating additive were separately tested by gas chromatography for volatiles which contribute to the objectionable odors associated with hot-mix asphalt. In each case, the composition was heated to 300° F. in a closed vessel and air samples taken from the overhead space. The air samples were evaluated by gas chromatography for odor-promoting volatiles. The hot-mix asphalt, with no additive present, contained the following amounts of volatiles: methane 12.8 ppm; ethane 12.3 ppm; propane 17.0 ppm; isobutane 1.9 ppm; n-butane 8.9 ppm; isopentane 2.5 ppm; n-pentane 5.9 ppm; pentenes 3.5 ppm; hexanes 21.3 ppm; and total aromatics 1.4 ppm. The hot-mix asphalt, with 1.0% of the odor eliminating additive present, contained the following amounts of volatiles: methane 6.1 ppm; ethane 4.8 ppm; propane 7.1 ppm; isobutane 1.3 ppm; n-butane 4.0 ppm; isopentane 1.3 ppm; n-pentane 3.1 ppm; pentenes 2.5 ppm; hexanes 16.1 ppm; and total aromatics 0.8 ppm. In every category, there was a substantial reduction in hydrocarbon volatiles. This, together with the elimination of odor as evidenced by smell, is convincing evidence of the elimination of odor by use of the additive described above.

Then 4.2 parts liquid asphalt/odor-eliminating additive agent composition was mixed with 95.8 parts aggregate and tested and found satisfactory as an odorless hot-mix asphalt for highway paving use or for patching. The odor-eliminating additive agent is biodegradable and meets environmental standards. The reduction in odor is sufficient to avoid the usual objections to the use of hot-mix asphalt and associated health hazards. The additive agent is also effective in eliminating asphalt odors, and other objectionable odors, from the exhaust gases for the plant in which the hot-mix asphalt is formulated or produced. The additive is not only effective with liquid asphalt and hot-mix asphalt, but also with hot-mix, cold-lay asphalt, rubberized hot mix asphalt or hot mix asphalt containing added latex.

EXAMPLE 5

An odor-eliminating additive composition is prepared by thoroughly mixing silicone oil into D-limonene at room temperature and corn oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts corn oil and 9.5 parts D-limonene.

This odor-eliminating additive composition is maintained at a temperature above 65° F. to produce a fluidity satisfactory for further processing. A mixture is prepared of 1.0 part of the odor-eliminating additive composition with 99.0 parts of liquid asphalt.

The odor-eliminating additive agent is biodegradable and meets environmental standards. The reduction in odor is sufficient to avoid the usual objections to the use of hot-mix asphalt and associated health hazards. The health asphalt alone and with 1% of the odor eliminating additive were separately tested by gas chromatography for volatiles which contribute to the objectionable odors associated with hot-mix asphalt. In each case, the composition was heated to 300° F. in a closed vessel and air samples taken from the overhead space. The air samples were evaluated by gas chromatography for odor-promoting volatiles. The liquid asphalt, with no additive present, contained the following amounts of volatiles: methane 12.8 ppm; ethane 12.3 ppm; propane 17.0 ppm; isobutane 1.9 ppm; n-butane 8.9 ppm; isopentane 2.5 ppm; n-pentane 5.9 ppm; pentenes 3.5 ppm; hexanes 21.3 ppm; and total aromatics 1.4 ppm. The hot-mix asphalt, with 1.0% of the odor eliminating additive present, contained the following amounts of volatiles: methane 6.1 ppm; ethane 4.8 ppm; propane 7.1 ppm; isobutane 1.3 ppm; n-butane 4.0 ppm; isopentane 1.3 ppm; n-pentane 3.1 ppm; pentenes 2.5 ppm; hexanes 16.1 ppm; and total aromatics 0.8 ppm. In every category, there was a substantial reduction in hydrocarbon volatiles. This, together with the elimination of odor as evidenced by smell, is convincing evidence of the elimination of odor by use of the additive described above.

Then 6 parts hot-mix asphalt/odor-eliminating additive agent composition was mixed with 94 parts aggregate and tested and found satisfactory as an odorless hot-mix asphalt for highway paving use or for patching. The odor-eliminating additive agent is biodegradable and meets environmental standards. The reduction in odor is sufficient to avoid the usual objections to the use of hot-mix asphalt and associated health hazards. The additive agent is also effective in eliminating asphalt odors, and other objectionable odors, from the exhaust gases for the plant in which the hot-mix asphalt is formulated or produced. The additive is not only effective with liquid asphalt and hot-mix asphalt, but also with hot-mix, cold-lay asphalt, rubberized hot mix asphalt or hot mix asphalt containing added latex.

EXAMPLE 6

An odor-eliminating additive composition is prepared by thoroughly mixing silicone oil into D-limonene at room temperature and sunflower oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts sunflower oil and 9.5 parts D-limonene.

This odor-eliminating additive composition is maintained at a temperature above 65° F. to produce a fluidity satisfactory for further processing. A mixture is prepared of 1.0 part of the odor-eliminating additive composition with 99.0 parts of liquid asphalt.

The odor-eliminating additive agent is biodegradable and meets environmental standards. The reduction in odor is sufficient to avoid the usual objections to the use of hot-mix asphalt and associated health hazards. The liquid asphalt alone and with 1% of the odor eliminating additive were separately tested by gas chromatography for volatiles which contribute to the objectionable odors associated with hot-mix asphalt. In each case, the composition was heated to 300° F. in a closed vessel and air samples taken from the overhead space. The air samples were evaluated by gas chromatography for odor-promoting volatiles. The hot-mix asphalt, with no additive present, contained the following amounts of volatiles: methane 12.8 ppm; ethane 12.3 ppm; propane 17.0 ppm; isobutane 1.9 ppm; n-butane 8.9 ppm; isopentane 2.5 ppm; n-pentane 5.9 ppm; pentenes 3.5 ppm; hexanes 21.3 ppm; and total aromatics 1.4 ppm. The hot-mix asphalt, with 1.0% of the odor eliminating additive present, contained the following amounts of volatiles: methane 6.1 ppm; ethane 4.8 ppm; propane 7.1 ppm; isobutane 1.3 ppm; n-butane 4.0 ppm; isopentane 1.3 ppm; n-pentane 3.1 ppm; pentenes 2.5 ppm; hexanes 16.1 ppm; and total aromatics 0.8 ppm. In every category, there was a substantial reduction in hydrocarbon volatiles. This, together with the elimination of odor as evidenced by smell, is convincing evidence of the elimination of odor by use of the additive described above.

Then 4.5 parts liquid asphalt/odor-eliminating additive agent composition was mixed with 95.5 parts aggregate and tested and found satisfactory as an odorless hot-mix asphalt for highway paving use or for patching. The odor-eliminating additive agent is biodegradable and meets environmental standards. The reduction in odor is sufficient to avoid the usual objections to the use of hot-mix asphalt and associated health hazards. The additive agent is also effective in eliminating asphalt odors, and other objectionable odors, from the exhaust gases for the plant in which the hot-mix asphalt is formulated or produced. The additive is not only effective with liquid asphalt and hot-mix asphalt, but also with hot-mix, cold-lay asphalt, rubberized hot mix asphalt or hot mix asphalt containing added latex.

EXAMPLE 7

An odor-eliminating additive composition is prepared by thoroughly mixing silicone oil into D-limonene at room temperature and palm oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts palm oil and 9.5 parts D-limonene.

This odor-eliminating additive composition is maintained at a temperature above 65° F. to produce a fluidity satisfactory for further processing. A mixture is prepared of 1.0 part of the odor-eliminating additive composition with 99.0 parts of liquid asphalt.

The odor-eliminating additive agent is biodegradable and meets environmental standards. The reduction in odor is sufficient to avoid the usual objections to the use of hot-mix asphalt and associated health hazards. The liquid asphalt alone and with 1% of the odor eliminating additive were separately tested by gas chromatography for volatiles which contribute to the objectionable odors associated with hot-mix asphalt. In each case, the composition was heated to 300° F. in a closed vessel and air samples taken from the overhead space. The air samples were evaluated by gas chromatography for odor-promoting volatiles. The liquid asphalt, with no additive present, contained the following amounts of volatiles: methane 12.8 ppm; ethane 12.3 ppm; propane 17.0 ppm; isobutane 1.9 ppm; n-butane 8.9 ppm; isopentane 2.5 ppm; n-pentane 5.9 ppm; pentenes 3.5 ppm; hexanes 21.3 ppm; and total aromatics 1.4 ppm. The hot-mix asphalt, with 1.0% of the odor eliminating additive present, contained the following amounts of volatiles: methane 6.1 ppm; ethane 4.8 ppm; propane 7.1 ppm; isobutane 1.3 ppm; n-butane 4.0 ppm; isopentane 1.3 ppm; n-pentane 3.1 ppm; pentenes 2.5 ppm; hexanes 16.1 ppm; and total aromatics 0.8 ppm. In every category, there was a substantial reduction in hydrocarbon volatiles. This, together with the elimination of odor as evidenced by smell, is convincing evidence of the elimination of odor by use of the additive described above.

Then 4 parts hot-mix asphalt/odor-eliminating additive agent composition was mixed with 96 parts aggregate and tested and found satisfactory as an odorless hot-mix asphalt for highway paving use or for patching. The odor-eliminating additive agent is biodegradable and meets environmental standards. The reduction in odor is sufficient to avoid the usual objections to the use of hot-mix asphalt and associated health hazards. The additive agent is also effective in eliminating asphalt odors, and other objectionable odors, from the exhaust gases for the plant in which the hot-mix asphalt is formulated or produced. The additive is not only effective with liquid asphalt and hot-mix asphalt, but also with hot-mix, cold-lay asphalt, rubberized hot mix asphalt or hot mix asphalt containing added latex.

EXAMPLE 8

An odor-eliminating additive composition is prepared by thoroughly mixing silicone oil into D-limonene at room temperature and coconut oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts coconut oil and 9.5 parts D-limonene.

This odor-eliminating additive composition is maintained at a temperature above 65° F. to produce a fluidity satisfactory for further processing. A mixture is prepared of 1.0 part of the odor-eliminating additive composition with 99.0 parts of liquid asphalt.

The odor-eliminating additive agent is biodegradable and meets environmental standards. The reduction in odor is sufficient to avoid the usual objections to the use of hot-mix asphalt and associated health hazards. The liquid asphalt alone and with 1% of the odor eliminating additive were separately tested by gas chromatography for volatiles which contribute to the objectionable odors associated with hot-mix asphalt. In each case, the composition was heated to 300° F. in a closed vessel and air samples taken from the overhead space. The air samples were evaluated by gas chromatography for odor-promoting volatiles. The hot-mix asphalt, with no additive present, contained the following amounts of volatiles: methane 12.8 ppm; ethane 12.3 ppm; propane 17.0 ppm; isobutane 1.9 ppm; n-butane 8.9 ppm; isopentane 2.5 ppm; n-pentane 5.9 ppm; pentenes 3.5 ppm; hexanes 21.3 ppm; and total aromatics 1.4 ppm. The hot-mix asphalt, with 1.0% of the odor eliminating additive present, contained the following amounts of volatiles: methane 6.1 ppm; ethane 4.8 ppm; propane 7.1 ppm; isobutane 1.3 ppm; n-butane 4.0 ppm; isopentane 1.3 ppm; n-pentane 3.1 ppm; pentenes 2.5 ppm; hexanes 16.1 ppm; and total aromatics 0.8 ppm. In every category, there was a substantial reduction in hydrocarbon volatiles. This, together with the elimination of odor as evidenced by smell, is convincing evidence of the elimination of odor by use of the additive described above.

Then 5 parts hot-mix asphalt/odor-eliminating additive agent composition was mixed with 95 parts aggregate and tested and found satisfactory as an odorless hot-mix asphalt for highway paving use or for patching. The odor-eliminating additive agent is biodegradable and meets environmental standards. The reduction in odor is sufficient to avoid the usual objections to the use of hot-mix asphalt and associated health hazards. The additive agent is also effective in eliminating asphalt odors, and other objectionable odors, from the exhaust gases for the plant in which the hot-mix asphalt is formulated or produced. The additive is not only effective with liquid asphalt and hot-mix asphalt, but also with hot-mix, cold-lay asphalt, rubberized hot mix asphalt or hot mix asphalt containing added latex.

EXAMPLE 10

An antistripping composition is prepared by thoroughly mixing silicone oil into D-limonene at room temperature and palm kernel oil mixed in. In formulating the composition, the silicone oil is first mixed with the D-limonene (because it is more soluble in this component) and the vegetable oil mixed in to produce the desired composition. The final proportions are 1.0 parts silicone oil; 89.5 parts palm kernel oil and 9.5 parts D-limonene.

This odor-eliminating additive composition is maintained at a temperature above 65° F. to produce a fluidity satisfactory for further processing. A mixture is prepared of 1.0 part of the odor-eliminating additive composition with 99.0 parts of liquid asphalt.

The odor-eliminating additive agent is biodegradable and meets environmental standards. The reduction in odor is sufficient to avoid the usual objections to the use of hot-mix asphalt and associated health hazards. The liquid asphalt alone and with 1% of the odor eliminating additive were separately tested by gas chromatography for volatiles which contribute to the objectionable odors associated with hot-mix asphalt. In each case, the composition was heated to 300° F. in a closed vessel and air samples taken from the overhead space. The air samples were evaluated by gas chromatography for odor-promoting volatiles. The hot-mix asphalt, with no additive present, contained the following amounts of volatiles: methane 12.8 ppm; ethane 12.3 ppm; propane 17.0 ppm; isobutane 1.9 ppm; n-butane 8.9 ppm; isopentane 2.5 ppm; n-pentane 5.9 ppm; pentenes 3.5 ppm; hexanes 21.3 ppm; and total aromatics 1.4 ppm. The hot-mix asphalt, with 1.0% of the odor eliminating additive present, contained the following amounts of volatiles: methane 6.1 ppm; ethane 4.8 ppm; propane 7.1 ppm; isobutane 1.3 ppm; n-butane 4.0 ppm; isopentane 1.3 ppm; n-pentane 3.1 ppm; pentenes 2.5 ppm; hexanes 16.1 ppm; and total aromatics 0.8 ppm. In every category, there was a substantial reduction in hydrocarbon volatiles. This, together with the elimination of odor as evidenced by smell, is convincing evidence of the elimination of odor by use of the additive described above.

Then 6.5 parts liquid asphalt/odor-eliminating additive agent composition was mixed with 93.5 parts aggregate and tested and found satisfactory as an odorless hot-mix asphalt for highway paving use or for patching. The odor-eliminating additive agent is biodegradable and meets environmental standards. The reduction in odor is sufficient to avoid the usual objections to the use of hot-mix asphalt and associated health hazards. The additive agent is also effective in eliminating asphalt odors, and other objectionable odors, from the exhaust gases for the plant in which the hot-mix asphalt is formulated or produced. The additive is not only effective with liquid asphalt and hot-mix asphalt, but also with hot-mix, cold-lay asphalt, rubberized hot mix asphalt or hot mix asphalt containing added latex.

EXAMPLE 11

An odor-eliminating additive composition is prepared by thoroughly mixing silicone oil into D-limonene at room temperature and a mixture of equal parts of cottonseed oil and soya oil mixed in. In formulating the composition, the silicone oil is first mixed with the D-limonene (because it is more soluble in this component) and the vegetable oil mixture mixed in to produce the desired composition. The final proportions are 1.0 parts silicone oil; 89.5 parts cottonseed/soya oil and 9.5 parts D-limonene.

This odor-eliminating additive composition is maintained at a temperature above 65° F. to produce a fluidity satisfactory for further processing. A mixture is prepared of 1.0 part of the odor-eliminating additive composition with 99.0 parts of liquid asphalt.

The odor-eliminating additive agent is biodegradable and meets environmental standards. The reduction in odor is sufficient to avoid the usual objections to the use of hot-mix asphalt and associated health hazards. The liquid asphalt alone and with 1% of the odor eliminating additive were separately tested by gas chromatography for volatiles which contribute to the objectionable odors associated with hot-mix asphalt. In each case, the composition was heated to 300° F. in a closed vessel and air samples taken from the overhead space. The air samples were evaluated by gas chromatography for odor-promoting volatiles. The liquid asphalt, with no additive present, contained the following amounts of volatiles: methane 12.8 ppm; ethane 12.3 ppm; propane 17.0 ppm; isobutane 1.9 ppm; n-butane 8.9 ppm; isopentane 2.5 ppm; n-pentane 5.9 ppm; pentenes 3.5 ppm; hexanes 21.3 ppm; and total aromatics 1.4 ppm. The hot-mix asphalt, with 1.0% of the odor eliminating additive present, contained the following amounts of volatiles: methane 6.1 ppm; ethane 4.8 ppm; propane 7.1 ppm; isobutane 1.3 ppm; n-butane 4.0 ppm; isopentane 1.3 ppm; n-pentane 3.1 ppm; pentenes 2.5 ppm; hexanes 16.1 ppm; and total aromatics 0.8 ppm. In every category, there was a substantial reduction in hydrocarbon volatiles. This, together with the elimination of odor as evidenced by smell, is convincing evidence of the elimination of odor by use of the additive described above.

Then 6.5 parts hot-mix asphalt/odor-eliminating additive agent composition was mixed with 93.5 parts aggregate and tested and found satisfactory as an odorless hot-mix asphalt for highway paving use or for patching. The odor-eliminating additive agent is biodegradable and meets environmental standards. The reduction in odor is sufficient to avoid the usual objections to the use of hot-mix asphalt and associated health hazards. The additive agent is also effective in eliminating asphalt odors, and other objectionable odors, from the exhaust gases for the plant in which the hot-mix asphalt is formulated or produced. The additive is not only effective with liquid asphalt and hot-mix asphalt, but also with hot-mix, cold-lay asphalt, rubberized hot mix asphalt or hot mix asphalt containing added latex.

While this invention has been described fully and completely with special emphasis on certain preferred embodiments, it should be understood that within the scope of the appended claims the invention may be practiced otherwise than as specifically described herein.

We claim:

1. An odor-free asphalt composition which consists essentially of
   a liquid asphalt composition, and an amount, sufficient to substantially eliminate odor from the asphalt, and other objectionable odors, of an additive composition comprising
   a vegetable oil,
   D-limonene, and
   a silicone oil dispersing agent in an amount sufficient to facilitate the mixture of the vegetable oil and D-limonene.

2. An odor-free asphalt composition according to claim 1 in which said additive composition consists essentially of
   85-90 parts vegetable oil,
   10-15 parts D-limonene, and
   an effective amount up to about 2 parts silicone oil dispersing agent, for eliminating odor,
   the parts in the composition totaling 100.

3. An odor-free asphalt composition according to claim 1 in which
   said vegetable oil is selected from the group consisting of cottonseed oil, soya oil, canola oil, peanut oil, corn oil, sunflower oil, palm oil, coconut oil, and palm kernel oil, and mixtures thereof.

4. An odor-free asphalt composition according to claim 1 in which said additive composition consists essentially of
   85-90 parts of a vegetable oil selected from the group consisting of cottonseed oil, soya oil, canola oil, peanut oil, corn oil, sunflower oil, palm oil, coconut oil, and palm kernel oil, and mixtures thereof,
   10-15 parts D-limonene, and
   an effective amount up to about 2 parts silicone oil dispersing agent, for eliminating odor,
   the parts in the composition totaling 100.

5. An odor-free asphalt composition according to claim 1 comprising
   99.0-99.5 parts liquid asphalt, and
   0.5-1.0 parts additive composition.

6. An odor-free hot-mix asphalt composition comprising a minor amount of a liquid asphalt/additive composition which consists essentially of
   99.0-99.5 parts liquid asphalt, and an amount in the range of 0.5-1.0 parts, sufficient to substantially eliminate odor from the asphalt, and other objectionable odors, of an additive composition comprising
   a vegetable oil,
   D-limonene, and
   a silicone oil dispersing agent in an amount sufficient to facilitate the mixture of the vegetable oil and D-limonene, and a major amount of aggregate.

7. An odor-free hot-mix asphalt composition according to claim 6 comprising
   4-8 parts liquid asphalt and additive composition, and
   92-96 parts aggregate.

8. An odor-free hot-mix asphalt composition according to claim 7 in which
   said additive composition in said liquid asphalt composition consists essentially of
   85-90 parts vegetable oil,
   10-15 parts D-limonene, and
   an effective amount up to about 2 parts silicone oil dispersing agent, for eliminating odor,
   the parts in the odor free composition totaling 100.

9. An odor-free hot-mix asphalt composition according to claim 7 in which said vegetable oil in said additive composition is selected from the group consisting of cottonseed oil, soya oil, canola oil, peanut oil, corn oil, sunflower oil, palm oil, coconut oil, and palm kernel oil, and mixtures thereof.

10. An odor-free hot-mix asphalt composition comprising a minor amount of a liquid asphalt/additive composition which consists essentially of
a liquid asphalt composition, and an amount, sufficient to substantially eliminate odor from the asphalt, and other objectionable odors, of an additive composition comprising
a vegetable oil,
D-limonene, and
a silicone oil dispersing agent in an amount sufficient to facilitate the mixture of the vegetable oil and D-limonene, and a major amount of aggregate.

11. An odor-free hot-mix asphalt composition according to claim 10 comprising
4–8 parts liquid asphalt and additive composition, and
92–96 parts aggregate.

12. An odor-free hot-mix asphalt composition according to claim 11 in which
said additive composition in said liquid asphalt composition consists essentially of
85–90 parts vegetable oil,
10–15 parts D-limonene, and
an effective amount up to about 2 parts silicone oil dispersing agent, for eliminating odor,
the parts in the odor free composition totaling 100.

13. An odor-free hot-mix asphalt composition according to claim 11 in which
said vegetable oil in said additive composition is selected from the group consisting of cottonseed oil, soya oil, canola oil, peanut oil, corn oil, sunflower oil, palm oil, coconut oil, and palm kernel oil, and mixtures thereof.

* * * * *